United States Patent
Wang

(10) Patent No.: US 7,979,208 B2
(45) Date of Patent: Jul. 12, 2011

(54) MOBILE TERMINAL WITH POSITION MEASUREMENT FUNCTION

(75) Inventor: Wan Wang, Sagamihara (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 781 days.

(21) Appl. No.: 11/700,497

(22) Filed: Jan. 31, 2007

(65) Prior Publication Data

US 2008/0051998 A1 Feb. 28, 2008

(30) Foreign Application Priority Data

Aug. 23, 2006 (JP) ................................ 2006-226801

(51) Int. Cl.
*G01C 21/00* (2006.01)

(52) U.S. Cl. .......... 701/213; 701/200; 455/521; 455/45; 455/456.6; 342/357.09

(58) Field of Classification Search .................. 701/213; 455/456.6; 342/357.09
See application file for complete search history.

(56) References Cited

U.S. PATENT DOCUMENTS 7,577,448 B2 * 8/2009 Pande et al. ................ 455/456.6
2002/0145560 A1 * 10/2002 Tsujimoto et al. ....... 342/357.09

FOREIGN PATENT DOCUMENTS

JP 2002-228738 A 8/2002

* cited by examiner

*Primary Examiner* — Mark Hellner
*Assistant Examiner* — Redhwan Mawari
(74) *Attorney, Agent, or Firm* — Maschoff Gilmore & Israelsen

(57) ABSTRACT

A mobile terminal according to this invention includes the first calculation module which autonomously calculates its own position based on a GPS signal, and the second calculation module which calculates its own position based on a acquired auxiliary information from a server and the GPS signal. A first control module causes a timer to start a time counting if the second position calculation module accesses the server. When the auxiliary information which satisfies a predetermined condition is not acquired in the time of the timer, the calculation module changes from the second calculation module to the first calculation module. The second control module determines the connection state with the server within the time of the timer. At the time point if the second control module determines that the connection state is an auxiliary information unobtainable state, the calculation module changes from the second calculation module to the first calculation module.

4 Claims, 3 Drawing Sheets

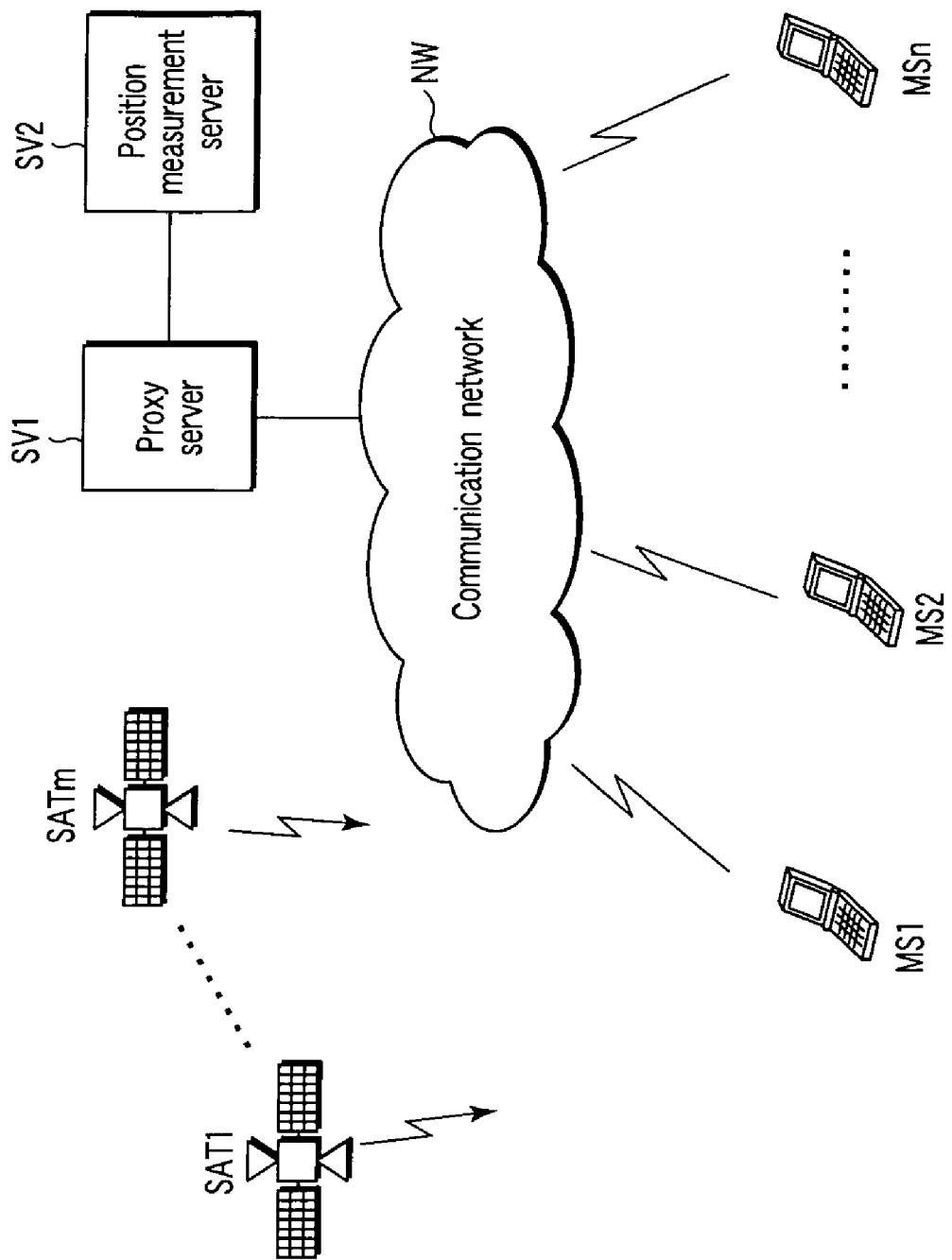
F I G. 1

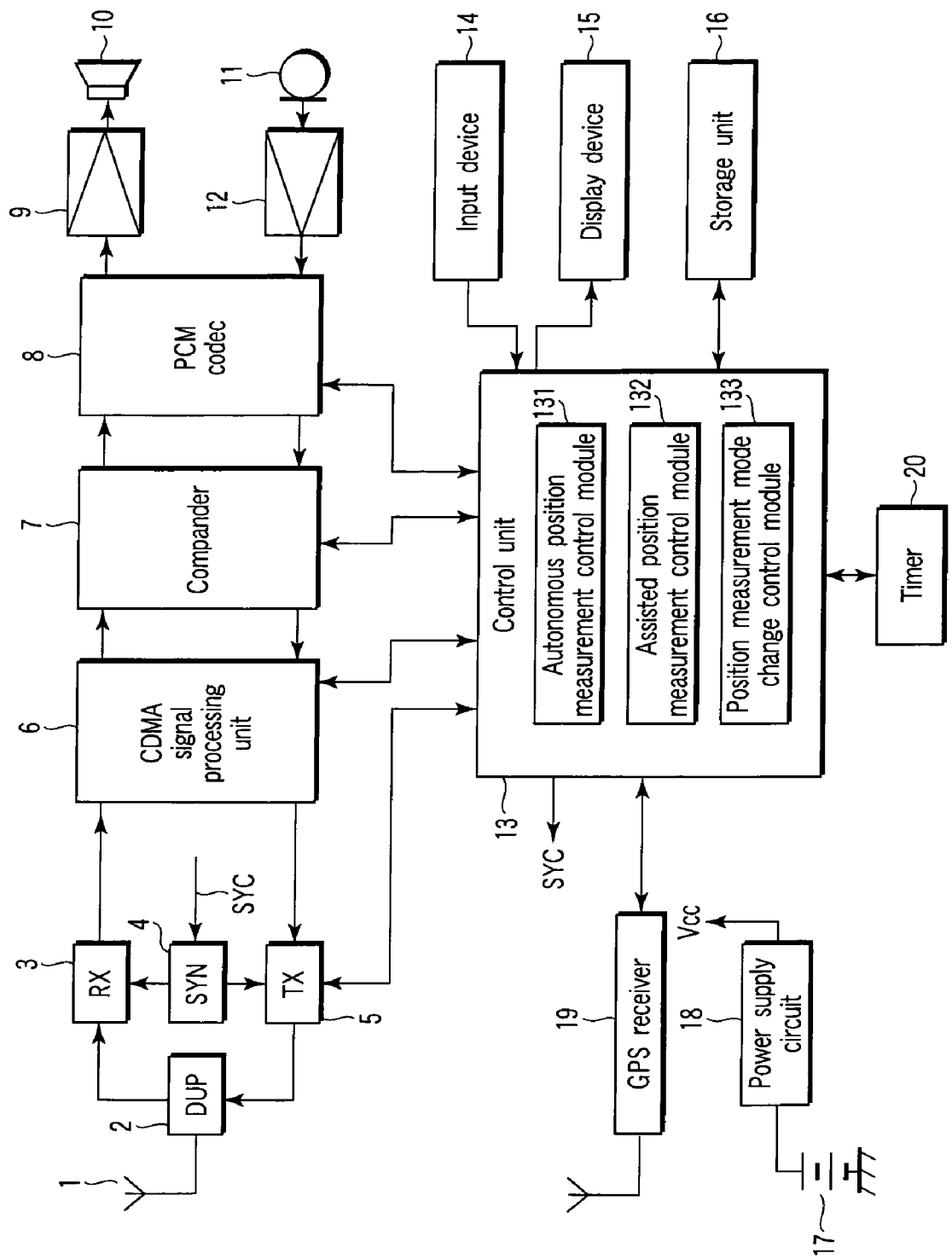
F I G. 2

MOBILE TERMINAL WITH POSITION MEASUREMENT FUNCTION

CROSS-REFERENCE TO RELATED APPLICATIONS

This application is based upon and claims the benefit of priority from prior Japanese Patent Application No. 2006-226801, filed Aug. 23, 2006, the entire contents of which are incorporated herein by reference.

BACKGROUND OF THE INVENTION

1. Field of the Invention

The present invention relates to a mobile terminal such as a cellular phone or personal digital assistant (PDA) and, more particularly, to a mobile terminal having a function of detecting its own position by using a Global Positioning System (GPS) receiver.

2. Description of the Related Art

Recently, in order to detect the position of a mobile terminal user, a mobile terminal with a Global Positioning System (GPS) receiver has been developed. This type of mobile terminal generally has an autonomous position measurement mode and assisted position measurement mode. In the autonomous position measurement mode, the mobile terminal detects its own position by receiving GPS signals transmitted from a plurality of GPS satellites, and performing position measurement calculation based on only the received signals. On the other hand, in the assisted position measurement mode, the mobile terminal detects its own position by acquiring auxiliary information necessary for position measurement calculation from a position measurement server via a communication network, and receiving GPS signals from the GPS satellites and performing position measurement calculation based on the acquired auxiliary information.

Generally, the conventional mobile terminal first performs a position measurement process in the assisted position measurement mode. When the position measurement result is abnormal, the conventional mobile terminal switches to the autonomous position measurement mode to perform the position measurement process. This technique is disclosed in, e.g., Jpn. Pat. Appln. KOKAI Publication No. 2002-228738. By using this technique, the position measurement process takes a shorter time in the assisted position measurement mode than in the autonomous position measurement mode, thereby shortening the position detection time.

However, a certain time is generally required to acquire auxiliary information from the position measurement server, in accordance with the quality of a communication network, the response state of the position measurement server, and the like. Since the conventional mobile terminal determines to switch from the assisted position measurement mode to the autonomous position measurement mode without any consideration of the time required to acquire the auxiliary information, adequate mode switching is not always achieved. To cope with such problem, conventionally, a technique has been proposed in which a timer is set, and the mobile terminal repeatedly tries to acquire the auxiliary information within the counting time of this timer in order to acquire the auxiliary information more reliably. The mobile terminal switches to the autonomous position measurement mode when the time set in the timer expires.

However, one cause which interferes with acquisition of the auxiliary information is the problem that communication with the position measurement server cannot be performed, e.g., when the mobile terminal is located outside a communication range or when the quality of a communication network is significantly low. In such case, the auxiliary information acquisition operation is repeated many times until the time set in the timer is reached although the auxiliary information cannot be acquired. Accordingly, a long time is wastefully required until the mobile terminal switches to the autonomous position measurement mode.

BRIEF SUMMARY OF THE INVENTION

The present invention has been made in consideration of the above situation, and has as its object to provide a mobile terminal having a function capable of shifting a position measurement mode to an autonomous position measurement mode based on GPS signals immediately when communication with a position measurement server cannot be performed.

In order to achieve the above object, a mobile terminal according to the present invention comprises a first position calculation module configured to autonomously calculate a position of the mobile terminal based on a Global Positioning System (GPS) signal, a second position calculation module configured to access the position measurement server via a communication network, acquire auxiliary information from the position measurement server, and calculate the position of the mobile terminal based on the acquired auxiliary information and the GPS signal, and a first change control module and a second change control module. The first change control module causes a timer to start a time counting operation if the second position calculation module accesses the position measurement server. When the auxiliary information satisfying a predetermined condition is not obtained within the counting time of the timer, the first change control module changes the position calculation module from the second position calculation module to the first position calculation module. The second change control module determines a connection state with the position measurement server in the counting time of the timer. When it is determined that the connection state is an auxiliary information unobtainable state, the second change control module changes the position calculation module from the second position calculation module to the first position calculation module.

As the second change control module, the following arrangement can be considered.

In the first arrangement, it is determined whether a communication link with the position measurement server is established in the counting time of the timer. When it is determined that the communication link is not established, the position calculation module changes from the second position calculation module to the first position calculation module.

In the second arrangement, it is determined whether an auxiliary information transmission disable message has arrived from the position measurement server in a state wherein a communication link with the position measurement server is established. When the message arrives, the position calculation module changes from the second position calculation module to the first position calculation module.

Therefore, according to the present invention, if it is determined that the auxiliary information cannot be acquired under the current connection state with the position measurement server, the position calculation module changes from the second position calculation module to the first position calculation module before the end of the counting time of a timer. For this reason, the connection process with the position measurement server is not uselessly repeated if it is determined that the communication with the position measurement server cannot be actually performed, e.g., if the mobile terminal is located outside the communication range or if the quality of a communication network is significantly low.

On the other hand, if it is determined that the auxiliary information can be acquired in the current connection state with the position measurement server, the auxiliary information acquisition process is repeated until the auxiliary information which satisfies a condition, within the counting time of a timer. As a result, the auxiliary information which satisfies the condition can be acquired with higher probability, and the mobile terminal can be prevented from easily shifting to the autonomous position measurement mode.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic view showing one embodiment of a mobile communication system having a position measurement function according to the present invention;

FIG. 2 is a functional block diagram showing the arrangement of a mobile terminal used in the system shown in FIG. 1.

DETAILED DESCRIPTION OF THE INVENTION

Figure 3:
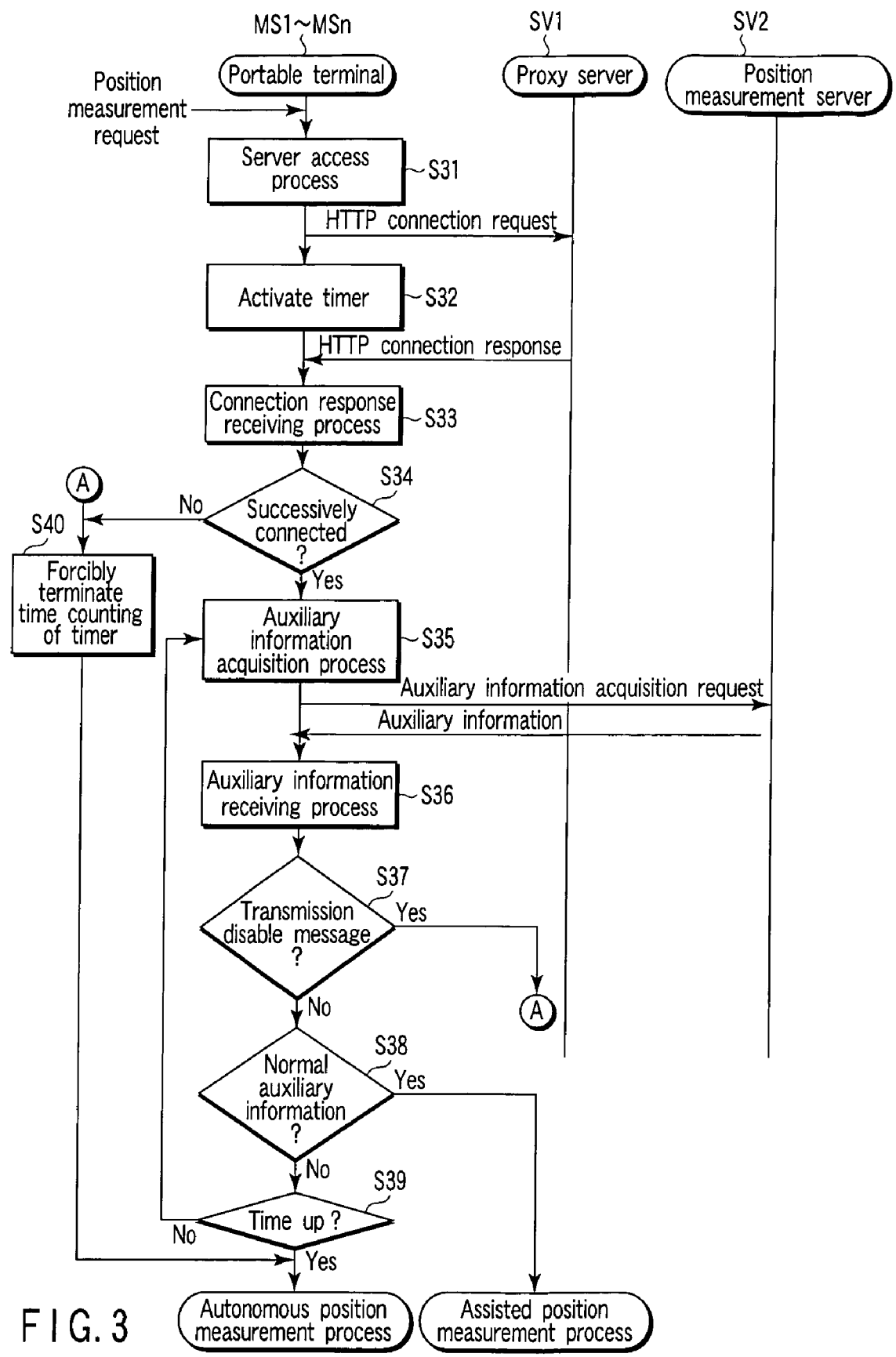
FIG. 3 is a flowchart showing the operation sequence of the system shown in FIG. 1, and the sequence and content of position measurement mode change control by the mobile terminal shown in FIG. 2.

An embodiment of the present invention will be described below with reference to the accompanying drawing.

FIG. 1 is a schematic view showing one embodiment of a mobile communication system according to the present invention. In this system, a plurality of mobile terminals MS1 to MSn can connect to a proxy server SV1 via a communication network NW. The plurality of mobile terminals MS1 to MSn can connect, via the proxy server SV1, to a position measurement server SV2 connected to the proxy server SV1.

The communication network NW includes, e.g., an Internet Protocol (IP) network represented by the Internet, and a plurality of access networks for accessing the IP network. The access networks include, e.g., a mobile communication network such as a mobile/cellular phone network or Personal Handyphone System (PHS), a wired subscriber network using a digital subscriber line (DSL) or optical transmission path, a local area network (LAN), a wireless LAN, and a dedicated line network.

The position measurement server SV2 comprises a web server which has a function of downloading auxiliary information in response to an acquisition request transmitted from each of the mobile terminals MS1 to MSn. The auxiliary information contains various kinds of data used to assist the position measurement calculation process of each of the mobile terminals MS1 to MSn. The proxy server SV1 that substitutes for the position measurement server SV2 has a function of accepting the access from each of the mobile terminals MS1 to MSn, and relaying a packet between the position measurement server SV2 and each of the mobile terminals MS1 to MSn.

Each of the mobile terminals MS1 to MSn has the following arrangement. FIG. 2 is a block diagram showing its functional arrangement.

That is, a radio signal transmitted from a base station (not shown) for mobile communication via the communication network NW is received by an antenna 1, and input to a receiving circuit (RX) 3 via a duplexer (DUP) 2. The receiving circuit 3 mixes the received radio signal with a local oscillation signal output from a frequency synthesizer (SYN) 4, and down-converts it into an intermediate frequency or baseband frequency. The receiving circuit 3 processes the frequency-converted reception signal by quadrature demodulation, and outputs a baseband demodulated signal. Note that the frequency of the local oscillation signal generated by the frequency synthesizer 4 is designated by a control signal SYC output from a control unit 13.

The reception baseband signal is input to a CDMA (Code Division Multiple Access) signal processing unit 6. The CDMA signal processing unit 6 includes a RAKE receiver. The RAKE receiver despreads a plurality of passes included in the reception baseband signal by using spread codes. The signals of these despread passes are synthesized after their phases are arbitrated. As a result, reception packet data having a predetermined transmission format is obtained. This reception packet data is input to a compressor/expander process unit (to be referred to as a compander hereinafter) 7.

The compander 7 demultiplexes the reception packet data output from the CDMA signal processing unit 6 into media data by a multiplexer/demultiplexer. The compander 7 individually decodes these demultiplexed media data. For example, if the reception packet data contains audio data, this audio data is decoded by a speech codec. Also, if the reception packet data contains video data, this video data is decoded by a video codec. A digital audio signal and a digital video signal obtained by the decoding process are respectively input to a pulse code modulation (PCM) coding unit (to be referred to as a PCM codec hereinafter) 8 and the control unit 13. If the reception packet data contains the data downloaded from the web server, this data is input to the control unit 13.

The PCM codec 8 decodes, by PCM, the digital audio signal output from the compander 7, and outputs an analog audio signal. This analog audio signal is amplified by an amplifier 9, and output from a loudspeaker 10.

The control unit 13 displays the digital video signal output from the compander 7 on a display device 15 using a video random access memory (RAM). Text data such as e-mail and the like is stored in a storage unit 16 and displayed on the LCD of the display device 15. When an input device 14 sets, e.g., an automatic answering mode, the compander 7 loads the audio and video data obtained before the decoding process, and stores these data in the incoming recording area of the storage unit 16.

A speech signal of a speaker input to a microphone 11 is amplified to an appropriate level by a transmission amplifier 12, coded into a digital audio signal by PCM by the PCM codec 8, and input to the compander 7. Also, a video signal captured by the camera (not shown) is converted into a digital signal by the control unit 13, and input to the compander 7. Note that the text data such as e-mail generated by the control unit 13 is also input from the control unit 13 to the compander 7.

The compander 7 detects the energy amount of the input speech from the digital audio signal output from the PCM codec 8, and determines a transmission data rate based on the detection result. Then, the compander 7 codes the digital audio signal into a signal having a format corresponding to the transmission data rate, thereby generating audio data. Also, the compander 7 codes the digital video signal output from the control unit 13, and generates video data. The multiplexer/demultiplexer multiplexes these audio data and video data in accordance with a predetermined transmission format to generate transmission packet data, and outputs this transmission packet data to the CDMA signal processing unit 6. Note that if the text data such as e-mail is output from the control unit 13, this text data is also multiplexed into packet data.

The CDMA signal processing unit 6 spreads the spectrum of the output transmission packet data from the compander 7 by using a spread code allocated to a transmission channel, and outputs the signal to a transmitting circuit (TX) 5. The transmitting circuit 5 modulates the signal having the spread spectrum by using a digital modulation method such as quadrature phase shift keying (QPSK) and quadrature amplitude modulation (QAM). The transmitting circuit 5 synthesizes the modulated transmission signal with the local oscillation signal generated from the frequency synthesizer 4, thereby up-converting the signal into a radio signal. Then, the transmitting circuit 5 amplifies the radio signal to a high frequency so that the transmission power level designated by the control unit 13 is obtained. The amplified radio signal is supplied to the antenna 1 via the duplexer 2, and transmitted from the antenna 1 to the mobile communication base station with which a wireless link is established.

The input device 14 includes functional keys such as a transmission key, end key, power key, volume control key, and a mode designation key in addition to a dial key. The display device 15 includes a liquid crystal display (LCD) and light emitting diode (LED) indicators. The LCD displays information representing the position of the mobile terminal calculated by a position measurement function (to be described later), in addition to the e-mail, video data, and the like described above. The LCD also displays phone book data, the telephone number of a terminal of the communication partner, an outgoing call/incoming call log, the operation state of the mobile terminal, and the like. The LED indicators are used to display incoming call notification information, the charge state of a battery 17. Reference numeral 18 denotes a power supply circuit which generates a predetermined operation power voltage Vcc based on the output from the battery 17, and supplies it to each unit.

Each of the mobile terminals MS1 to MSn of this embodiment includes a GPS receiver 19. Based on the instruction from the control unit 13, the GPS receiver 19 receives GPS signals transmitted from a plurality of GPS satellites SAT1 to SATm shown in FIG. 1, and supplies them to the control unit 13 for position measurement calculation.

The control unit 13 with a central processing unit (CPU) includes an autonomous position measurement control module 131, assisted position measurement control module 132, and position measurement mode change control module 133 as control modules according to the present invention. The control modules 131, 132, and 133 are implemented by causing the CPU to execute an application program stored in a ROM (not shown).

The autonomous position measurement control module 131 searches GPS signals transmitted from the respective GPS satellites SAT1 to SATm, and specifies a plurality of GPS signals required for position measurement. The autonomous position measurement control module 131 then receives the specified GPS signals, and calculates the position information of the mobile terminal by performing position measurement calculation based on the received GPS signals.

The assisted position measurement control module 132 obtains auxiliary information from the position measurement server SV2 by accessing the position measurement server SV2 via the proxy server SV1. The assisted position measurement control module 132 receives GPS signals from the plurality of GPS satellites required for position measurement calculation based on the obtained auxiliary information, and then calculates the position information by performing position measurement calculation based on the received GPS signals and obtained auxiliary information.

The position measurement mode change control module 133 includes the first and second change control modules. The first change control module causes the timer 20 to start a time counting operation at the time point if the assisted position measurement control module 132 starts accessing the proxy server SV1. If normal auxiliary information cannot be obtained within the counting time of the timer 20, the position measurement mode changes from the assisted position measurement mode to the autonomous position measurement mode after the time over of the timer 20.

In obtaining the auxiliary information from the position measurement server SV2, the second change control module determines whether connection with the proxy server SV1 has been successfully established within the counting time of the timer 20. If it is determined that connection has failed, or if the information returned from the position measurement server SV2 is a transmission disable message, the second change control module forcibly terminates the time counting operation of the timer 20 immediately, and changes the position measurement mode from the assisted position measurement mode to the autonomous position measurement mode.

The operations of the above-described mobile terminals MS1 to MSn will be described next. FIG. 3 is a sequence diagram for explaining these operations.

In each of the mobile terminals MS1 to MSn, upon activating a position measurement application and issuing a position measurement request, the control unit 13 first starts the position measurement process in the assisted position measurement mode. That is, the control unit 13 accesses the position measurement server SV2 in step S31. First, in this access process, the control unit 13 wirelessly accesses the mobile communication base station of the communication network NW. When a wireless link with the base station is established by such wireless access process, a communication link with the proxy server SV1 is established via the IP network of the communication network NW. Upon establishing the communication link with the proxy server SV1, the control unit 13 of each of the mobile terminals MS1 to MSn transmits an HTTP connection request to the proxy server SV1.

Upon starting the above-described access process, the control unit 13 activates the timer 20 to start the time counting operation in step S32. In this state, the control unit 13 monitors an HTTP connection response from the proxy server SV1 in step S33. Upon receiving the HTTP connection request and confirming the authenticity of the mobile terminal as a request source, the proxy server SV1 sends back the HTTP connection response. Based on the reception result of the HTTP connection response, the control unit 13 of each of the mobile terminals MS1 to MSn determines in step S34 whether connection with the proxy server SV1 has been successively established.

As a result of the above determination, when connection with the proxy server SV1 has been successively established, the control unit 13 shifts to step S35, and then executes an auxiliary information acquisition process. In this auxiliary information acquisition process, the control unit 13 transmits an auxiliary information acquisition request to the position measurement server SV2 via the communication network NW and proxy server SV1.

Upon reception of the auxiliary information acquisition request, the position measurement server SV2 determines whether the requested auxiliary information can be transmitted. If the requested auxiliary information can be transmitted, the position measurement server SV2 returns the corresponding auxiliary information. This auxiliary information is transferred to one of the mobile terminals MS1 to MSn as a request source via the proxy server SV1 and communication network NW. On the other hand, if the auxiliary information cannot be transmitted in response to the acquisition request, the position measurement server SV2 returns the transmission disable message to one of the mobile terminals MS1 to MSn as the request source.

In step S36, the control unit 13 of each of the mobile terminals MS1 to MSn receives the information returned from the position measurement server SV2. The control unit 13 determines in step S37 whether the received information is the transmission disable message, and also determines in step S38 whether the received information is normal data by checking the presence/absence of a transmission error in the received information. As a result of this determination, if the received information is normal auxiliary information, the mobile terminal shifts to the assisted position measurement calculation process. In this assisted position measurement calculation process, the mobile terminal receives GPS signals to be received from the plurality of GPS satellites based on the auxiliary information, and calculates the position information by performing position measurement calculation based on the received GPS signals and acquired auxiliary information.

On the other hand, assume that it is determined in step S38 that the received auxiliary information is abnormal because it has a transmission error and the like. In this case, the control unit 13 determines in step S39 whether the time set in the timer 20 has expired. If the time in the timer 20 has not expired, the process returns to step S35 to repeatedly execute the auxiliary information acquisition process. When the control unit 13 can acquire normal auxiliary information by repeatedly performing the acquisition processes, the mobile terminal shifts to the assisted position measurement calculation process as described above.

On the other hand, assume that the control unit 13 cannot obtain the normal auxiliary information even by repeatedly performing the acquisition request processes, and the time in the timer 20 has expired. In this case, the control unit 13 determines that the position information cannot be calculated by the assisted position measurement calculation process, changes the position measurement mode to the autonomous position measurement mode, and executes the autonomous position measurement calculation process hereinafter. In the autonomous position measurement calculation process, the control unit 13 searches and specifies some of GPS satellites SAT1 to SATm required for position measurement. The control unit 13 then receives the GPS signals transmitted from the specified GPS satellites SAT1 to SATm, and calculates the position information of the mobile terminal by performing position measurement calculation based on the received GPS signals.

On the other hand, assume that connection with the proxy server SV1 has failed because of a low quality of the communication network NW or a fault of the proxy server SV1. In this case, the control unit 13 shifts from step S34 to step S40, and forcibly terminates the time counting operation of the timer 20, changes the position measurement mode from the assisted position measurement mode to the autonomous position measurement mode, and executes the autonomous position measurement calculation process hereinafter.

When the information returned from the position measurement server SV2 is a transmission disable message, the control unit 13 also shifts from step S37 to step S40. In step S40, the control unit 13 forcibly terminates the time counting operation of the timer 20, changes the position measurement mode from the assisted position measurement mode to the autonomous position measurement mode, and executes the autonomous position measurement calculation process hereinafter.

As described above, according to this embodiment, it is determined whether connection with the proxy server SV1 is successively established within the counting time of the timer 20 in order to acquire the auxiliary information from the position measurement server SV2 in the assisted position measurement mode. If it is determined that the connection has failed, the time counting operation of the timer 20 is forcibly terminated immediately, and the position measurement mode changes from the assisted position measurement mode to the autonomous position measurement mode. If the information returned from the position measurement server SV2 is a transmission disable message although connection with the position measurement server SV2 is successively established, the time counting operation of the timer 20 is forcibly terminated immediately, and the position measurement mode changes from the assisted position measurement mode to the autonomous position measurement mode.

Therefore, when connection with the proxy server SV1 has failed because of a low quality of the communication network NW or a fault of the proxy server SV1, or when the position measurement server SV2 cannot transmit the auxiliary information, the position measurement mode immediately changes from the assisted position measurement mode to the autonomous position measurement mode even in the counting time of the timer 20. As a result, the time for calculating the position information can be shortened when compared to a case wherein the position measurement mode changes to the autonomous position measurement mode after the time-over of the timer 20.

Note that the present invention is not limited to this embodiment. For example, the mobile terminal acquires the auxiliary information from the position measurement server SV2 via the proxy server SV1 in this embodiment. However, the present invention is not limited to this. The mobile terminal may directly access the position measurement server SV2 to acquire the auxiliary information from the position measurement server SV2.

Additionally, in this embodiment, the timer 20 is implemented by hardware in addition to the control unit 13, and used to count an auxiliary information acquisition time by using the hardware timer 20. However, the present invention is not limited to this. The timer may be implemented by software in the control unit 13 to count the auxiliary information acquisition time by using the software timer.

When the proxy server SV1 has a function of transmitting a connection rejection message, the mobile terminal may monitor the arrival of the message, forcibly terminate the time counting operation of the timer at the time point when the message arrives, and change the position measurement mode to the autonomous position measurement mode.

In addition to these functions, the present invention can be variously modified without departing from the spirit and scope of the invention in respects of the type and arrangement of the mobile terminal, and sequence and content of the position measurement mode change control.

Note that the present invention is not limited to the above embodiments, and can be variously modified and implemented without departing from the spirit and scope of the invention upon practice. Various inventions can be achieved by an appropriate combination of building components disclosed in the embodiment. For example, several building components may be omitted from all the building components described in the embodiment. Further, building components in different embodiments may be properly combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile terminal connectable to a position measurement server via a communication network and a proxy server, comprising:
   a first position calculation module which calculates a position of the mobile terminal based on a Global Positioning System (GPS) signal;
   a second position calculation module which accesses the position measurement server via the communication network and the proxy server, acquires auxiliary information from the position measurement server, and calculates the position of the mobile terminal based on the acquired auxiliary information and the GPS signal;
   a timer which starts measurement of a preset time period when the second position calculation module establishes a connection with the proxy server; and
   a change control module which determines, during the preset time period, whether a transmission disable message is directly received from the position measurement server without intervention of the proxy server and the communication network, and changes control from the second position calculation module to the first position calculation module even before the preset time period elapses when it is determined that the transmission disable message is received.

2. The terminal according to claim 1, further comprising:
   a communication link determination unit which determines, during the preset time period, whether a communication link is established between the second position calculation module and the position measurement server; and
   a control module which changes control from the second position calculation module to the first position calculation module even before the preset time period elapses, when the communication link determination unit determines that the communication link is not established.

3. A position measurement calculation process control method for a mobile terminal which is connectable to a position measurement server via a communication network and a proxy server, the method comprising:
   controlling to perform a first position calculation process which comprises calculating a position of the mobile terminal based on a Global Positioning System (GPS) signal;
   controlling to perform a second position calculation process which comprises accessing the position measurement server via the communication network and the proxy server, acquiring auxiliary information from the position measurement server, and calculating the position of the mobile terminal based on the acquired auxiliary information and the GPS signal;
   starting measurement of a preset time period when a connection with the proxy server is established; and
   determining, during the preset time period, whether a transmission disable message is directly received from the position measurement server without intervention of the proxy server and the communication network, and changing control from the second position calculation process to the first position calculation process even before the preset time period elapses when it is determined that the transmission disable message is received.

4. The method according to claim 3, further comprising:
   determining, during the preset time period, whether a communication link is established between the mobile terminal and the position measurement server; and
   changing control from the second position calculation process to the first position calculation process even before the preset time period elapses, when it is determined that the communication link is not established.

* * * * *